United States Patent
Macdonald et al.

(10) Patent No.: US 11,286,625 B2
(45) Date of Patent: Mar. 29, 2022

(54) SURFACE COMPACTOR MACHINE HAVING CONCENTRICALLY ARRANGED ECCENTRIC MASSES

(71) Applicant: Volvo Construction Equipment AB, Eskilstuna (SE)

(72) Inventors: Michael Macdonald, Shippensburg, PA (US); Christopher Grove, Fayetteville, PA (US)

(73) Assignee: Volvo Construction Equipment AB, Eskilstuna (SE)

(*) Notice: Subject to any disclaimer, the term of this patent is extended or adjusted under 35 U.S.C. 154(b) by 62 days.

(21) Appl. No.: 16/766,000

(22) PCT Filed: Nov. 21, 2017

(86) PCT No.: PCT/US2017/062796
§ 371 (c)(1),
(2) Date: May 21, 2020

(87) PCT Pub. No.: WO2019/103724
PCT Pub. Date: May 31, 2019

(65) Prior Publication Data
US 2020/0354902 A1 Nov. 12, 2020

(51) Int. Cl.
*E01C 19/28* (2006.01)
*B06B 1/16* (2006.01)
(Continued)

(52) U.S. Cl.
CPC .............. *E01C 19/286* (2013.01); *B06B 1/16* (2013.01); *E01C 19/282* (2013.01); *E01C 21/00* (2013.01); *E02D 3/074* (2013.01); *F16C 19/38* (2013.01)

(58) Field of Classification Search
CPC ...... E01C 19/282; E01C 19/286; E01C 21/00; B06B 1/16; F16C 19/38; E02D 3/074
(Continued)

(56) References Cited

U.S. PATENT DOCUMENTS 3,722,380 A    3/1973  Kaltenegger
6,717,379 B1*  4/2004  Andersson .............. B06B 1/161
                                                   318/114
(Continued)

FOREIGN PATENT DOCUMENTS

CN    1407179 A    4/2003
CN   200940250 Y   8/2007
(Continued)

OTHER PUBLICATIONS

Chinese First Office Action dated Jun. 2, 2021 for Chinese Patent Application No. 201780097009.0, 34 pages (including English translation).
(Continued)

*Primary Examiner* — Raymond W Addie
(74) *Attorney, Agent, or Firm* — Sage Daily Docket

(57) ABSTRACT

A vibration assembly for a surface compactor machine includes a support subassembly connected to the compacting surface of the surface compactor machine. A primary eccentric shaft is disposed around a secondary eccentric shaft, with the primary and secondary eccentric shafts both rotatable about a common axis of rotation. One or more of primary bearing subassemblies is disposed between the primary eccentric shaft and the support subassembly for supporting the primary eccentric shaft during rotation of the primary eccentric shaft. One or more secondary bearing subassemblies is disposed between the secondary eccentric
(Continued)

shaft and the primary eccentric shaft for supporting the secondary eccentric shaft during rotation of the primary eccentric shaft.

17 Claims, 12 Drawing Sheets

(51) Int. Cl.
    *E01C 21/00*     (2006.01)
    *E02D 3/074*     (2006.01)
    *F16C 19/38*     (2006.01)

(58) Field of Classification Search
    USPC ............ 404/72, 75, 84.05–84.5, 113, 117
    See application file for complete search history.

(56) References Cited

U.S. PATENT DOCUMENTS

| | | | | |
|---|---|---|---|---|
| 6,769,838 | B2* | 8/2004 | Potts | E01C 19/286 404/117 |
| 8,590,408 | B2 | 11/2013 | Stein et al. | |
| 9,725,855 | B2* | 8/2017 | Kreische | E02D 3/074 |
| 2003/0082002 | A1 | 5/2003 | Potts | |
| 2017/0306574 | A1 | 10/2017 | Macdonald | |

FOREIGN PATENT DOCUMENTS

| | | |
|---|---|---|
| CN | 101837341 A | 9/2010 |
| CN | 102418336 A | 4/2012 |
| CN | 202577115 U | 12/2012 |
| CN | 204356622 U | 5/2015 |
| DE | 19510562 A1 | 9/1996 |

OTHER PUBLICATIONS

International Search Report and Written Opinion of the International Searching Authority, PCT/US2017/062796, dated Feb. 5, 2018, 9 pages.

* cited by examiner

SURFACE COMPACTOR MACHINE HAVING CONCENTRICALLY ARRANGED ECCENTRIC MASSES

CROSS REFERENCE TO RELATED APPLICATIONS

This application is a 35 U.S.C. § 371 national stage application of PCT International Application No. PCT/US2017/062796 filed on Nov. 21, 2017, the disclosure and content of which is incorporated by reference herein in its entirety.

FIELD

Embodiments of the present invention relate to surface compactor machines, and more particularly to surface compactor machines having concentrically arranged eccentric masses that rotate to generate vibration forces that induce mechanical compaction of a substrate.

BACKGROUND

Surface compactors are used to compact a variety of substrates including soil, asphalt, or other materials. Surface compactors are provided with one or more compacting surfaces for this purpose. For example, a roller compactor may be provided with one or more cylindrical drums that provide compacting surfaces for compacting substrates.

Roller compactors use the weight of the compactor applied through rolling drums to compress a surface of the substrate being rolled. In addition, one or more of the drums of some roller compactors may be vibrated by a vibration system to induce additional mechanical compaction of the substrate being rolled. The vibration system can include one or more eccentric masses that are rotated to generate a vibration force which excites the compacting surface of the drum. How the substrate to be compacted will respond to the force of the drum is dependent on several variables, such as dimensions of the drum, time that the drum is applying force, vibration amplitude, vibration frequency, and substrate characteristics, such as its density and temperature.

Known roller compactors typically need to repetitively pass over an asphalt substrate 5 to 7 times to achieve a typically desired compaction density. More compaction of the substrate can be obtained from each pass by applying more force from the roller surface. However, factors that limit how much force can be applied each pass include a need to maintain rotational speeds within the vibration assembly below certain thresholds, to avoid exceeding speed and force ratings for particular components of the vibration system. Exceeding these thresholds can reduce the useful life of the components of the vibration system, and can also lead to damage to these and other components of the vibration system.

SUMMARY

One embodiment of the invention is directed to a surface compactor machine. The surface compactor machine comprises a compacting surface for compacting a substrate. The surface compactor machine further comprises a support subassembly connected to the compacting surface. The surface compactor machine further comprises a primary eccentric shaft having a first axis of rotation. The surface compactor machine further comprises a secondary eccentric shaft disposed in a recess within the primary eccentric shaft, the secondary eccentric shaft having the first axis of rotation. The surface compactor machine further comprises a primary bearing subassembly disposed between the primary eccentric shaft and the support subassembly for transferring vibration from the primary eccentric shaft through the support subassembly to the compacting surface. The surface compactor machine further comprises a secondary bearing subassembly disposed between the primary eccentric shaft and the secondary eccentric shaft for supporting the secondary eccentric shaft and transferring vibration from the secondary eccentric shaft to the primary eccentric shaft during rotation of the secondary eccentric shaft with respect to the primary eccentric shaft. The surface compactor machine further comprises at least one motor coupled to the secondary eccentric shaft and the primary eccentric shaft for simultaneously rotating the primary eccentric shaft about the first axis of rotation at a first rotational speed and rotating the secondary eccentric shaft about the first axis of rotation at a second rotational speed, wherein the primary eccentric shaft rotates with respect to the secondary eccentric shaft at a non-zero relative rotational speed.

Another embodiment of the invention is directed to a method of compacting a substrate using a surface compacting machine. The method comprises rotating, with at least one motor, a primary eccentric shaft about a first axis of rotation at a first rotational speed. The method further comprises rotating, with the at least one motor, a secondary eccentric shaft disposed in a recess within the primary eccentric shaft about the first axis of rotation at a second rotational speed, wherein the primary eccentric shaft rotates with respect to the secondary eccentric shaft at a non-zero relative rotational speed. Rotating the secondary eccentric shaft at the first rotational speed and rotating the primary eccentric shaft at the second rotational speed causes a secondary bearing subassembly disposed between the secondary eccentric shaft and the second eccentric shaft to rotate at a third rotational speed. Rotating the secondary eccentric shaft at the first rotational speed and rotating the primary eccentric shaft at the second rotational speed causes vibration to be transferred through the secondary eccentric shaft, the primary eccentric shaft, and a support subassembly supporting the primary eccentric shaft to vibrate a compacting surface coupled to the support subassembly.

Another embodiment of the invention is directed to a surface compactor vehicle. The surface compactor vehicle comprises a vehicle chassis and a compacting roller assembly coupled to the vehicle chassis. The compacting roller assembly comprises a substantially cylindrical compacting surface for rolling over a substrate to compact the substrate. The compacting roller assembly further comprises a support subassembly connected to the compacting surface. The compacting roller assembly further comprises a secondary eccentric shaft having a first axis of rotation. The compacting roller assembly further comprises a primary eccentric shaft disposed around the secondary eccentric shaft, the primary eccentric shaft having the first axis of rotation. The compacting roller assembly further comprises a secondary bearing subassembly disposed between the secondary eccentric shaft and the primary eccentric shaft for supporting the secondary eccentric shaft during rotation of the secondary eccentric shaft with respect to the primary eccentric shaft. The compacting roller assembly further comprises a primary bearing subassembly disposed between the primary eccentric shaft and the support subassembly for transferring vibration from the secondary eccentric shaft and the primary eccentric shaft through the support subassembly to the compacting surface. The compacting roller assembly further comprises at least one motor coupled to the secondary eccentric shaft and the primary eccentric shaft for simultaneously rotating the secondary eccentric shaft at a first rotational speed about the first axis of rotation and rotating the primary eccentric shaft at a second rotational speed, wherein the primary eccentric shaft rotates with respect to the secondary eccentric shaft at a non-zero relative rotational speed.

Other surface compactor machines, methods, and control systems according to embodiments will be or become apparent to one with skill in the art upon review of the following drawings and detailed description. It is intended that all such additional surface compactor machines, methods, and control systems be included within this description and protected by the accompanying claims. Moreover, it is intended that all embodiments disclosed herein can be implemented separately or combined in any way and/or combination

ASPECTS

According to some aspects, a surface compactor machine is disclosed. The surface compactor machine comprises a compacting surface for compacting a substrate. The surface compactor machine further comprises a support subassembly connected to the compacting surface. The surface compactor machine further comprises a primary eccentric shaft having a first axis of rotation. The surface compactor machine further comprises a secondary eccentric shaft disposed in a recess within the primary eccentric shaft, the secondary eccentric shaft having the first axis of rotation. The surface compactor machine further comprises a primary bearing subassembly disposed between the primary eccentric shaft and the support subassembly for transferring vibration from the primary eccentric shaft through the support subassembly to the compacting surface. The surface compactor machine further comprises a secondary bearing subassembly disposed between the primary eccentric shaft and the secondary eccentric shaft for supporting the secondary eccentric shaft and transferring vibration from the secondary eccentric shaft to the primary eccentric shaft during rotation of the secondary eccentric shaft with respect to the primary eccentric shaft. The surface compactor machine further comprises at least one motor coupled to the secondary eccentric shaft and the primary eccentric shaft for simultaneously rotating the primary eccentric shaft about the first axis of rotation at a first rotational speed and rotating the secondary eccentric shaft about the first axis of rotation at a second rotational speed, wherein the primary eccentric shaft rotates with respect to the secondary eccentric shaft at a non-zero relative rotational speed.

According to another aspect, the surface compactor machine further comprises a controller for controlling the at least one motor during a compaction operation while the compacting surface is rotating to continuously rotate the primary and eccentric shafts at different rotational speeds.

According to another aspect, the first rotational speed is in a first rotational direction about the first axis of rotation and the second rotational speed is at least two times the second rotational speed in the first rotational direction.

According to another aspect, the first rotational speed is in a first rotational direction about the first axis of rotation and the second rotational speed is in a second rotational direction opposite the first rotational direction.

According to another aspect, the surface compactor machine further comprises at least a portion of the secondary bearing subassembly is movable with respect to the primary eccentric shaft and the secondary eccentric shaft such that rotating the primary eccentric shaft at the first rotational speed and rotating the secondary eccentric shaft at the second rotational speed causes the at least a portion of the secondary bearing subassembly to rotate about the first axis of rotation at a third rotational speed substantially equal to a difference between the first rotational speed and the second rotational speed.

According to another aspect the third rotational speed is at least 1000 rpm.

According to another aspect, the secondary bearing subassembly comprises a plurality of roller bearing subassemblies. Each roller bearing subassembly comprises an outer collar engaging the primary eccentric shaft, an inner collar engaging the secondary eccentric shaft, and a plurality of roller bearings disposed between the outer collar and inner collar for rolling the outer collar and the inner collar about the first axis of rotation with respect to each other at a third rotational speed in response to the primary eccentric shaft rotating about the first axis of rotation at the first rotational speed and the secondary eccentric shaft rotating about the first axis of rotation at the second rotational speed, the third rotational speed substantially equal to a difference between the first rotational speed and the second rotational speed.

According to another aspect, the primary eccentric shaft comprises a primary imbalance mass, a first journal, and a second journal, the primary imbalance mass disposed between the first journal and the second journal. The secondary eccentric shaft comprises a secondary imbalance mass, a first shaft portion, and a second shaft portion, the secondary imbalance mass disposed between the first shaft portion and the second shaft portion. The secondary bearing subassembly comprises a first secondary bearing subassembly disposed between an inner surface of the first journal of the primary eccentric shaft and an outer surface of the first shaft portion of the secondary eccentric shaft, and a second secondary bearing subassembly disposed between an inner surface of the second journal of the primary eccentric shaft and an outer surface of the second shaft portion of the secondary eccentric shaft.

According to another aspect, the primary bearing subassembly comprises a first primary bearing subassembly disposed between an outer surface of the first journal of the primary eccentric shaft and the support subassembly, and a second primary bearing subassembly disposed between an outer surface of the second journal of the primary eccentric shaft and the support subassembly.

According to another aspect, each of the first journal and the second journal comprises a wide annular portion having a first internal surface engaging a first external surface of the secondary bearing subassembly, the first internal surface and the first external surface substantially having a first diameter, and a narrow annular portion having a second external surface engaging a second internal surface of the primary bearing subassembly, the second internal surface and the second external surface substantially having a second diameter smaller than the first diameter.

According to another aspect, the at least one motor comprises a first motor coupled to the primary eccentric shaft for rotating the primary eccentric shaft, and a second motor coupled to the secondary eccentric shaft for rotating the secondary eccentric shaft independently of the first motor rotating the primary eccentric shaft.

According to another aspect, the first motor comprises a first output shaft rotating about the first axis of rotation and coupled to the primary eccentric shaft, and the second motor comprises a second output shaft rotating about the first axis of rotation and coupled to the secondary eccentric shaft.

According to another aspect, the first motor comprises a first output shaft for rotating about a second axis of rotation different from the first axis of rotation, the first output shaft coupled to the primary eccentric shaft. The second motor comprises a second output shaft for rotating about the first axis of rotation, the second output shaft coupled to the secondary eccentric shaft. The surface compactor machine further comprises a transmission subassembly coupled between the first output shaft of the first motor and the primary eccentric shaft.

According to another aspect, the surface compactor machine further comprises a transmission subassembly coupled between the at least one motor and the primary eccentric shaft, the transmission subassembly having a fixed speed ratio substantially equal to the second rotational speed divided by the first rotational speed.

According to another aspect, the surface compactor machine further comprises a tertiary eccentric shaft disposed in a recess within the secondary eccentric shaft, the tertiary eccentric shaft having the first axis of rotation, and a tertiary bearing subassembly disposed between the secondary eccentric shaft and the tertiary eccentric shaft for supporting the tertiary eccentric shaft during rotation of the tertiary eccentric shaft with respect to the secondary eccentric shaft. The at least one motor is coupled to the tertiary eccentric shaft for rotating the tertiary eccentric shaft at a third rotational speed.

According to another aspect, the surface compactor machine further comprises a quaternary eccentric shaft disposed around the tertiary eccentric shaft and inside the primary bearing subassembly, the quaternary eccentric shaft having the first axis of rotation, and a quaternary bearing subassembly disposed between the tertiary eccentric shaft and the quaternary eccentric shaft for supporting the quaternary eccentric shaft during rotation of the quaternary eccentric shaft with respect to the tertiary eccentric shaft. The at least one motor is coupled to the quaternary eccentric shaft for rotating the quaternary eccentric shaft at a fourth rotational speed.

According to some other aspects, a method of compacting a substrate using a surface compacting machine is disclosed. The method comprises rotating, with at least one motor, a primary eccentric shaft about a first axis of rotation at a first rotational speed. The method further comprises rotating, with the at least one motor, a secondary eccentric shaft disposed in a recess within the primary eccentric shaft about the first axis of rotation at a second rotational speed, wherein the primary eccentric shaft rotates with respect to the secondary eccentric shaft at a non-zero relative rotational speed. Rotating the secondary eccentric shaft at the first rotational speed and rotating the primary eccentric shaft at the second rotational speed causes a secondary bearing subassembly disposed between the secondary eccentric shaft and the second eccentric shaft to rotate at a third rotational speed. Rotating the secondary eccentric shaft at the first rotational speed and rotating the primary eccentric shaft at the second rotational speed causes vibration to be transferred through the secondary eccentric shaft, the primary eccentric shaft, and a support subassembly supporting the primary eccentric shaft to vibrate a compacting surface coupled to the support subassembly.

According to another aspect, rotating the secondary eccentric shaft at the first rotational speed and rotating the primary eccentric shaft at the second rotational speed causes at least a portion of the secondary bearing subassembly to rotate about the first axis of rotation at a third rotational speed substantially equal to a difference between the first rotational speed and the second rotational speed.

According to another aspect, the third rotational speed is at least 1000 rpm.

According to another aspect, the secondary bearing subassembly comprises a plurality of roller bearing subassemblies. Each roller bearing subassembly comprises an outer collar engaging the primary eccentric shaft, an inner collar engaging the secondary eccentric shaft, and a plurality of roller bearings disposed between the outer collar and inner collar. Causing the at least a portion of the secondary bearing subassembly to rotate about the first axis of rotation at the third rotational speed comprises rolling the plurality of roller bearings about the first axis of rotation to rotate the outer collar and inner collar with respect to each other about the first axis of rotation at substantially the third rotational speed.

According to some other aspects, a surface compactor vehicle is disclosed. The surface compactor vehicle comprises a vehicle chassis and a compacting roller assembly coupled to the vehicle chassis. The compacting roller assembly comprises a substantially cylindrical compacting surface for rolling over a substrate to compact the substrate. The compacting roller assembly further comprises a support subassembly connected to the compacting surface. The compacting roller assembly further comprises a secondary eccentric shaft having a first axis of rotation. The compacting roller assembly further comprises a primary eccentric shaft disposed around the secondary eccentric shaft, the primary eccentric shaft having the first axis of rotation. The compacting roller assembly further comprises a secondary bearing subassembly disposed between the secondary eccentric shaft and the primary eccentric shaft for supporting the secondary eccentric shaft during rotation of the secondary eccentric shaft with respect to the primary eccentric shaft. The compacting roller assembly further comprises a primary bearing subassembly disposed between the primary eccentric shaft and the support subassembly for transferring vibration from the secondary eccentric shaft and the primary eccentric shaft through the support subassembly to the compacting surface. The compacting roller assembly further comprises at least one motor coupled to the secondary eccentric shaft and the primary eccentric shaft for simultaneously rotating the secondary eccentric shaft at a first rotational speed about the first axis of rotation and rotating the primary eccentric shaft at a second rotational speed, wherein the primary eccentric shaft rotates with respect to the secondary eccentric shaft at a non-zero relative rotational speed.

According to another aspect, at least a portion of the secondary bearing subassembly is movable with respect to the primary eccentric shaft and the secondary eccentric shaft such that rotating the primary eccentric shaft at the first rotational speed and rotating the secondary eccentric shaft at the second rotational speed causes the at least a portion of the secondary bearing subassembly to rotate about the first axis of rotation at a third rotational speed substantially equal to a difference between the first rotational speed and the second rotational speed.

According to another aspect, the third rotational speed is at least 1000 rpm.

According to another aspect, the secondary bearing subassembly a plurality of roller bearing subassemblies. Each roller bearing subassembly comprises an outer collar engaging the primary eccentric shaft, an inner collar engaging the secondary eccentric shaft, and a plurality of roller bearings disposed between the outer collar and inner collar for rolling the outer collar and the inner collar about the first axis of rotation with respect to each other at a third rotational speed in response to the primary eccentric shaft rotating about the first axis of rotation at the first rotational speed and the secondary eccentric shaft rotating about the first axis of rotation at the second rotational speed, the third rotational speed substantially equal to a difference between the first rotational speed and the second rotational speed.

BRIEF DESCRIPTION OF THE DRAWINGS

The accompanying drawings, which are included to provide a further understanding of the disclosure and are incorporated in and constitute a part of this application, illustrate certain non-limiting embodiments. In the drawings.

DETAILED DESCRIPTION OF EMBODIMENTS

Figure 1:
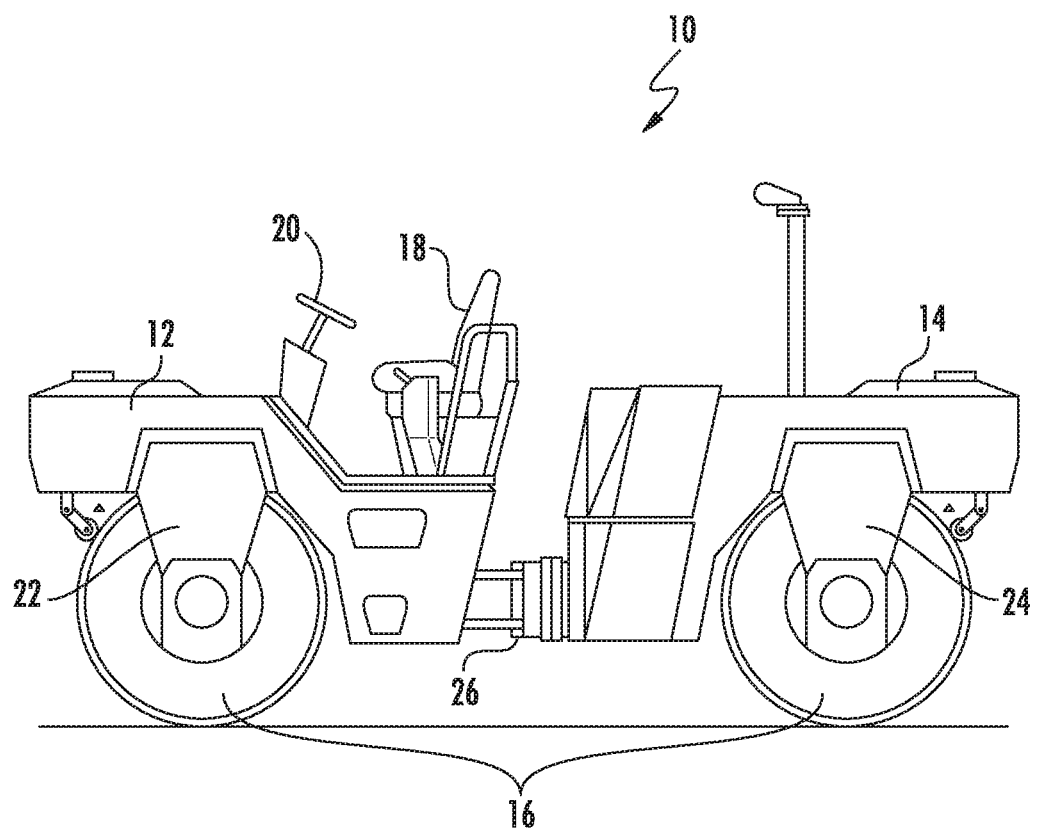
FIG. 1 is a side view of a surface compactor machine according to some embodiments.

FIG. 1 illustrates a self-propelled roller-type surface compactor machine 10 according to some embodiments. The surface compactor machine 10 can include a chassis 12, 14, rotatable drums 16 at the front and back of the chassis, and a driver station including a seat 18 and a steering mechanism 20 (e.g., a steering wheel) to provide driver control of the compaction machine. Moreover, each drum may be coupled to the chassis 12, 14 using a respective yoke 22, 24. One or both of the drums 16 may be driven by a drive motor in the chassis under control of the driver to propel the surface compactor machine 10. An articulable coupling 26 may be provided in the chassis to facilitate steering about a vertical axis. In this example, the drums 16 have a cylindrical outer surface that forms a compacting surface for compacting an underlying substrate, such as asphalt, gravel, soil, etc. According to one aspect of embodiments, one or both of the drums 16 each includes a vibration assembly 200 that includes primary and second eccentric shafts that are rotated as discussed below to generate vibration forces that are applied to the drums to assist with compaction of the substrate.

Various embodiments are described herein by way of non-limiting examples in the context of the roller-type surface compactor machine 10. It is to be understood that the embodiments are not limited to the particular configurations disclosed herein and may furthermore be used with other types of surface compactor machines, including vibrating plate type surface compactor machines.

Figure 2:
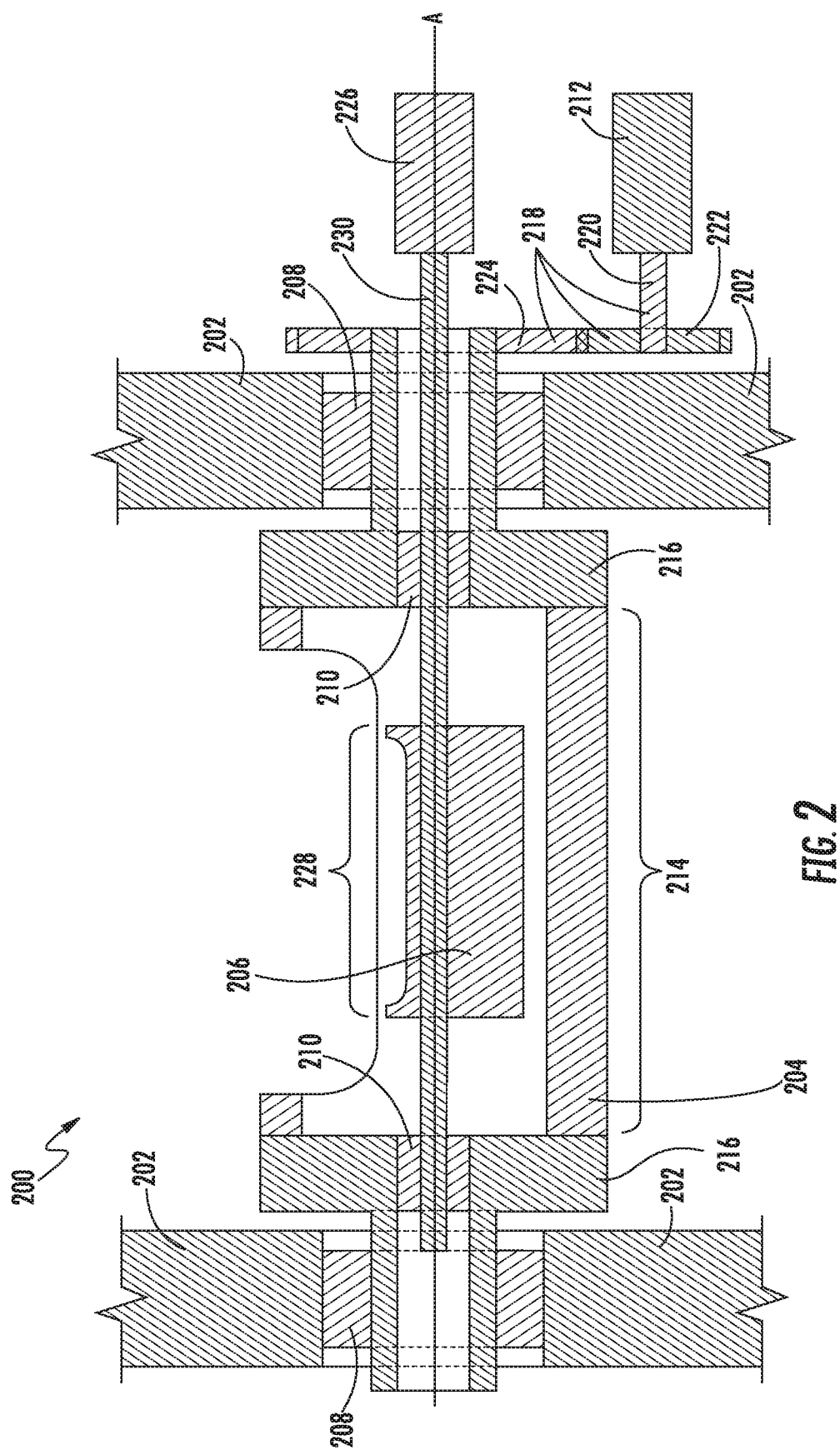
FIG. 2 is a simplified schematic cutaway view of a vibration assembly having primary and secondary eccentric shafts that are rotated by a pair of motors and which may be used with the surface compactor machine of FIG. 1 according to some embodiments.

In this regard, FIG. 2 is a simplified schematic cutaway view of the vibration assembly 200 according to one embodiment for a surface compactor machine (not shown), similar to the surface compactor machine 10 of FIG. 1 above. As shown, the vibration assembly 200 of the present embodiment includes a support subassembly 202, a primary eccentric shaft 204, a secondary eccentric shaft 206, primary and secondary bearing subassemblies 208, 210, a primary motor 212, a primary imbalance mass, 214, a pair of journals 201, a primary transmission subassembly 218, a primary transmission shaft 220, a drive gear 222, a driven gear 224, a secondary motor 226, a secondary imbalance mass 228, and a secondary transmission shaft 230.

According to one aspect of the present embodiment, the support subassembly 202 is connected to the compacting surface (e.g., the drum 16 of FIG. 1) of the surface compactor machine 10 to transfer vibration from the vibration assembly 200 to the substrate through the compacting surface.

According to another aspect of the present embodiment, the first and second eccentric shafts 204 are adapted to rotate. According to yet another aspect of the present embodiment, the first and second eccentric shafts are adapted to rotate relative to each other.

In the embodiment shown FIG. 2, the primary eccentric shaft 204 is shown disposed around a secondary eccentric shaft 206, with the primary and secondary eccentric shafts 204, 206 both rotatable about a common axis of rotation A. According to yet another aspect of the present embodiment, a pair of primary bearing subassemblies 208 is disposed between the primary eccentric shaft 204 and the support subassembly 202 and a pair of secondary bearing subassemblies 210 is shown disposed between the secondary eccentric shaft 206 and the primary eccentric shaft 204. Those of ordinary skill in the art will appreciate that the primary bearing subassemblies 210 support the primary eccentric shaft 204 and allow for relative rotation between the primary eccentric shaft 204 and the support assembly 202. Those of ordinary skill will furthermore appreciate that the pair of secondary bearing subassemblies 210 supports the secondary eccentric shaft 206 and allows for relative rotation between the primary eccentric shaft 204 and the secondary eccentric shaft 206.

Also shown in FIG. 2, the primary motor 212 is coupled to the primary eccentric shaft 204 for rotating the primary eccentric shaft 204 about the axis of rotation A. In this example, the primary eccentric shaft 204 comprises a primary imbalance mass 214 coupled between a pair of journals 216, which are supported by the primary bearing subassemblies 208, and a primary transmission subassembly 218 is coupled between an output shaft (not shown) of the primary motor 212 and the primary eccentric shaft 204. The primary transmission subassembly 218 includes a primary transmission shaft 220 coupled between the output shaft of the primary motor 212 and a drive gear 222, which drives a driven gear 224 coupled to one of the journals 216.

Similarly, a secondary motor 226 is shown coupled to the secondary eccentric shaft 206 for rotating the secondary eccentric shaft 206 about the common axis of rotation A at a rotational speed that can be different from the primary eccentric shaft 204, i.e., the primary eccentric shaft 204 rotates with respect to the secondary eccentric shaft 206 at a non-zero relative rotational speed. In this example, the secondary eccentric shaft 206 includes a secondary imbalance mass 228 coupled to a secondary transmission shaft 230 that is driven by the secondary motor 226.

According to one aspect of the present embodiment, the shafts 204, 206 may be driven independently of each other. By way of example, the shaft 204 may be rotated while shaft 206 is rotationally stationary and vice versa. By way of another example, the shaft 204 may be rotated at a first speed that is greater than a second speed at which the shaft 206 is rotated. By way of still yet another example, the shafts 204, 206 may be rotated in opposite directions simultaneously.

According to still yet another aspect of the present embodiment, the secondary eccentric shaft 206 can be rotated with respect to the support subassembly 202 at significantly higher speeds than the primary eccentric shaft 204. This is because the secondary bearing subassemblies 210, which are disposed between the primary eccentric shaft 204 and secondary eccentric shaft 206, only rotate with a rotational speed that is the difference in the rotational speeds of the primary and secondary eccentric shafts 204, 206. For example, if the primary eccentric shaft 204 rotates at 1000 rpm with respect to the support subassembly 202 and the secondary eccentric shaft 206 rotates at 2000 rpm with respect to the support subassembly 202 in the same direction, the secondary bearing subassembly 210 only needs to rotate at 1000 rpm, because the secondary eccentric shaft 206 is rotating 1000 rpm relative to the primary eccentric shaft 204. In this manner, the absolute rotational speed of one of the primary and secondary eccentric shafts 204, 206 can be significantly higher than the absolute rotational speed of the other of the primary and secondary eccentric shafts 204, 206, e.g., up to two to three times as fast or higher, resulting in a rotational speed of the secondary bearing subassemblies 210 of up to 1000 rpm or more, up to the maximum speed rating of the secondary bearing subassemblies 210. This ability to run the primary and secondary eccentric shafts 204, 206 at different speeds relative to each other in turn allows for the generation of vibratory motion of the compacting surface that are more varied and complex than the simple vibratory motion produced by existing vibration assemblies.

This arrangement may also allow for many other different configurations and modes of operation. For example, by independently driving the primary and secondary eccentric shafts 204, 206, the primary and secondary eccentric shafts 204, 206 can be rotated at the same or different speeds and in the same or opposite directions to generate more complex wave forms that improve compaction efficiency. Moreover, the independent rotation of the primary and secondary eccentric shafts 204, 206 can adjust the orientation of the primary and secondary eccentric shafts 204, 206 with respect to each other to modify the combined center of mass of the primary and secondary eccentric shafts 204, 206, which may be used to increase or decrease a resulting vibratory amplitude for the vibration assembly 200. The relative orientation of the primary and secondary eccentric shafts 204, 206 can also be dynamically adjusted without limitation while the rotatable drums 16 are rolling during forward/reverse movement of the compactor machine 10, thereby reducing or eliminating the need to stop compactor machine 10 and the vibration assembly 200 to make manual adjustments to the relative orientations of the primary and secondary eccentric shafts 204, 206. In addition, by rotating the primary and secondary eccentric shafts 204, 206 concentrically about a common axis of rotation A, torsional vibration is avoided, which reduces torsional loading on the rest of the machine.

Figure 3:
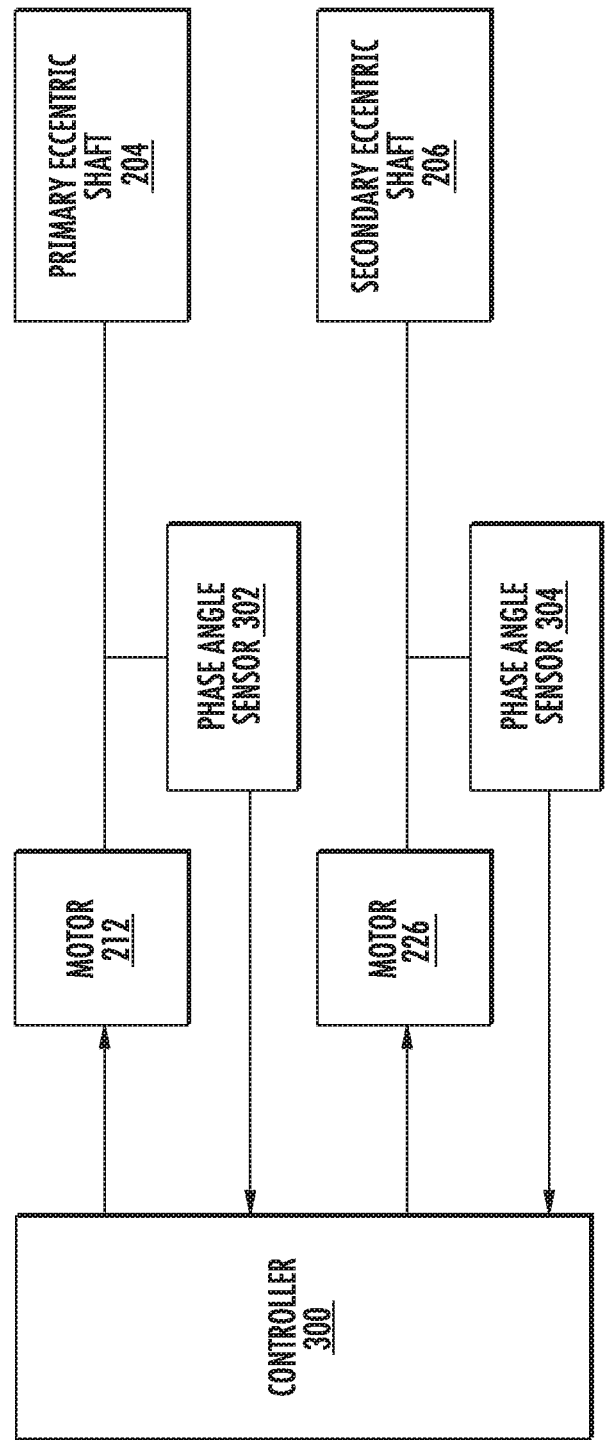
FIG. 3 is a block diagram of a control system that can be used to control rotation of the primary and secondary eccentric shafts of FIG. 2 according to some embodiments.

In this embodiment, the primary motor 212 and the secondary motor 226 are independently driven, but it may also be desirable to control one of the primary and secondary motors 212, 226 based on the speed and/or rotational position of the other of the primary and secondary motors 212, 226. In this regard, FIG. 3 is a block diagram of a control system that can be used to control rotation of the primary and secondary eccentric shafts 204, 206 of FIG. 2 according to some embodiments. In this example, the control system of FIG. 3 includes a controller 300 that controls speed of at least one of the primary and secondary motors 212, 226 during a compaction operation while the compaction surface, such as the drums 16 of FIG. 1, are rotating. The controller 300 may control speed of the primary and/or secondary motors 212, 226 to control the rotational speeds of the primary and secondary eccentric shafts 204, 206. In one example, the controller 300 may control the primary motor 212 to rotate the primary eccentric shaft 204 at a first predetermined absolute speed with respect to the support assembly 202 and may also control the secondary motor 226 to rotate the secondary eccentric shaft at a second predetermined absolute speed with respect to the support assembly 202. In another example, the controller may control one of the primary or secondary motors 212, 226 to rotate a respective one of the primary or secondary eccentric shafts 204, 206 at a predetermined speed relative to an actual speed of the other of the primary or secondary eccentric shafts 204, 206. This differential in speed between the primary and secondary eccentric shafts 204, 206 generates movement of the vibration assembly 200 that vibrates the compacting surface upwards and downwards according to a composite displacement waveform, such as the composite displacement waveform shown in FIG. 12, for example. In some embodiments, including FIG. 12, for example, the rotational speed of the secondary eccentric shaft 206 is an integer greater than 1 times faster than the rotational speed of the primary eccentric shaft 204. In these embodiments, the composite displacement waveform can include a zero-amplitude coordinate corresponding to a zero-amplitude position of the vibration assembly 200, a wave section located above the zero-amplitude coordinate, and a wave section located below the zero amplitude coordinate that is asymmetric relative to the wave section located above the zero-amplitude coordinate.

As will be explained in further detail below with respect to FIG. 12, in some embodiments the controller 300 of FIG. 3 controls the speed of the primary and secondary eccentric shafts 204, 206 so the wave section located below the zero-amplitude coordinate includes a sequence of a first occurring downward peak, a second occurring upward peak, and a third occurring downward peak that has a larger downward amplitude than the first occurring downward peak. The speed may be controlled so that the maximum upward amplitude of the wave section located above the zero-amplitude coordinate is greater than the maximum downward amplitude of the wave section located below the zero-amplitude coordinate. The speed may be controlled so that a center of mass location of the secondary eccentric shaft 206 has a leading rotational angle offset ahead of a center of mass location of the primary eccentric shaft 204 when the center of mass location of the primary eccentric shaft 204 is at its maximum distance from the substrate to be compacted (e.g., the underlying asphalt, gravel, soil, etc.).

The control system may also include a first phase angle sensor 302 that is configured to output a first signal indicating a rotational angle of the primary eccentric shaft 204, and a second phase angle sensor 304 that is configured to output a second signal indicating a rotational phase angle of the secondary eccentric shaft 206. The controller 300 can be configured to control speed of at least one of the primary and secondary motors 212, 226 responsive to a detected difference between the rotational angles indicated by the first and second signals. This may be accomplished via independently controlling the primary and secondary eccentric shafts 204, 206, or by controlling one of the primary and secondary eccentric shafts 204, 206 with respect to the other, for example.

In some embodiments, the controller 300 controls speed of at least one of the primary and secondary motors 212, 226 so that the rotational speed of the secondary eccentric shaft 206 is substantially twice as fast as the rotational speed of the primary eccentric shaft 204. The center of mass location of the secondary eccentric shaft 206 may also have a leading rotational angle offset within a range of about 5 degrees to about 45 degrees ahead of the center of mass location of the primary eccentric shaft 204 when the center of mass location of the primary eccentric shaft 204 is at its maximum distance from the substrate.

Figure 4:
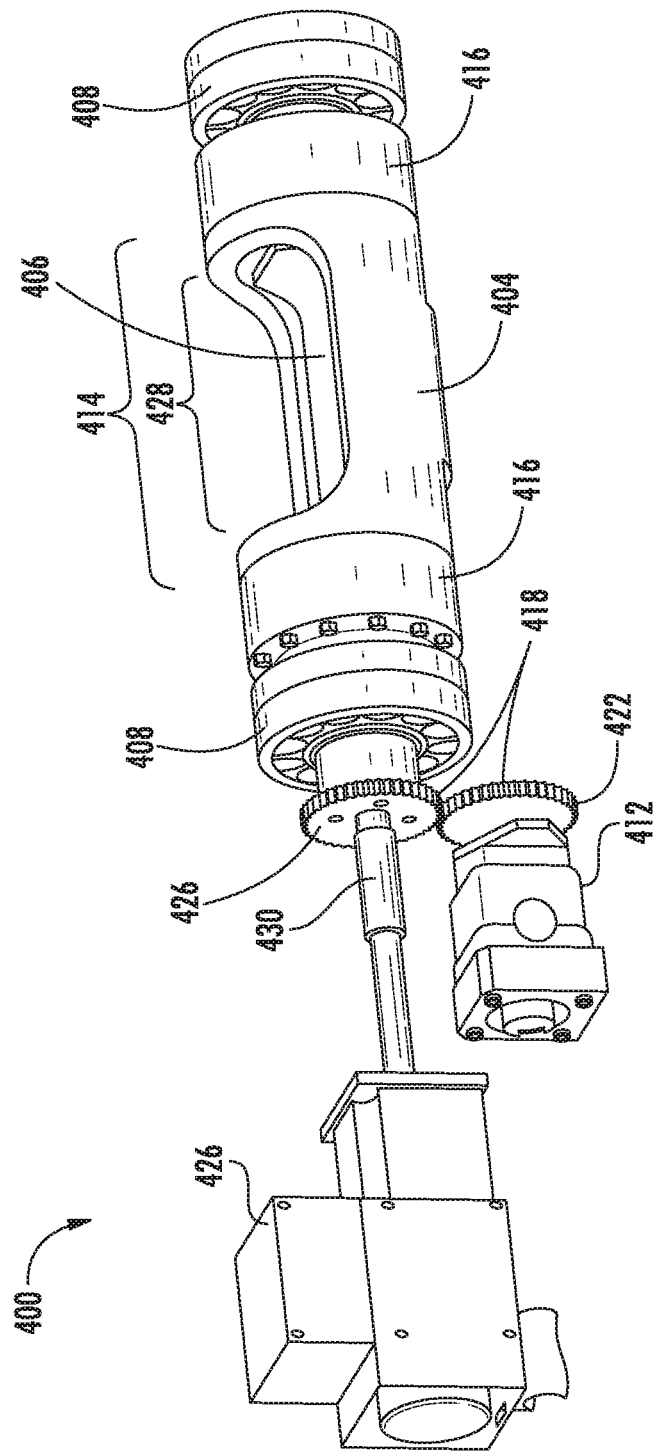
FIG. 4 is a view of a vibration assembly having primary and secondary eccentric shafts similar to the vibration assembly of FIG. 2, illustrating additional details of the vibration assembly.

FIG. 4 is a view of a vibration assembly 400 similar to the vibration assembly 200 of FIG. 2. The vibration assembly 400 of FIG. 4 has primary and secondary eccentric shafts 404, 406 that are rotated by a pair of primary and secondary motors 412, 426, and which may be used with the surface compactor machine 10 of FIG. 1 according to some embodiments. In this embodiment, the secondary eccentric shaft 406 is at least partially enclosed in a hollow interior space of the primary eccentric shaft 404. In this manner, the primary eccentric shaft forms an annular primary imbalance mass 414 with the independently rotatable secondary imbalance mass 428 of the secondary eccentric shaft 406 disposed therein.

Figure 5:
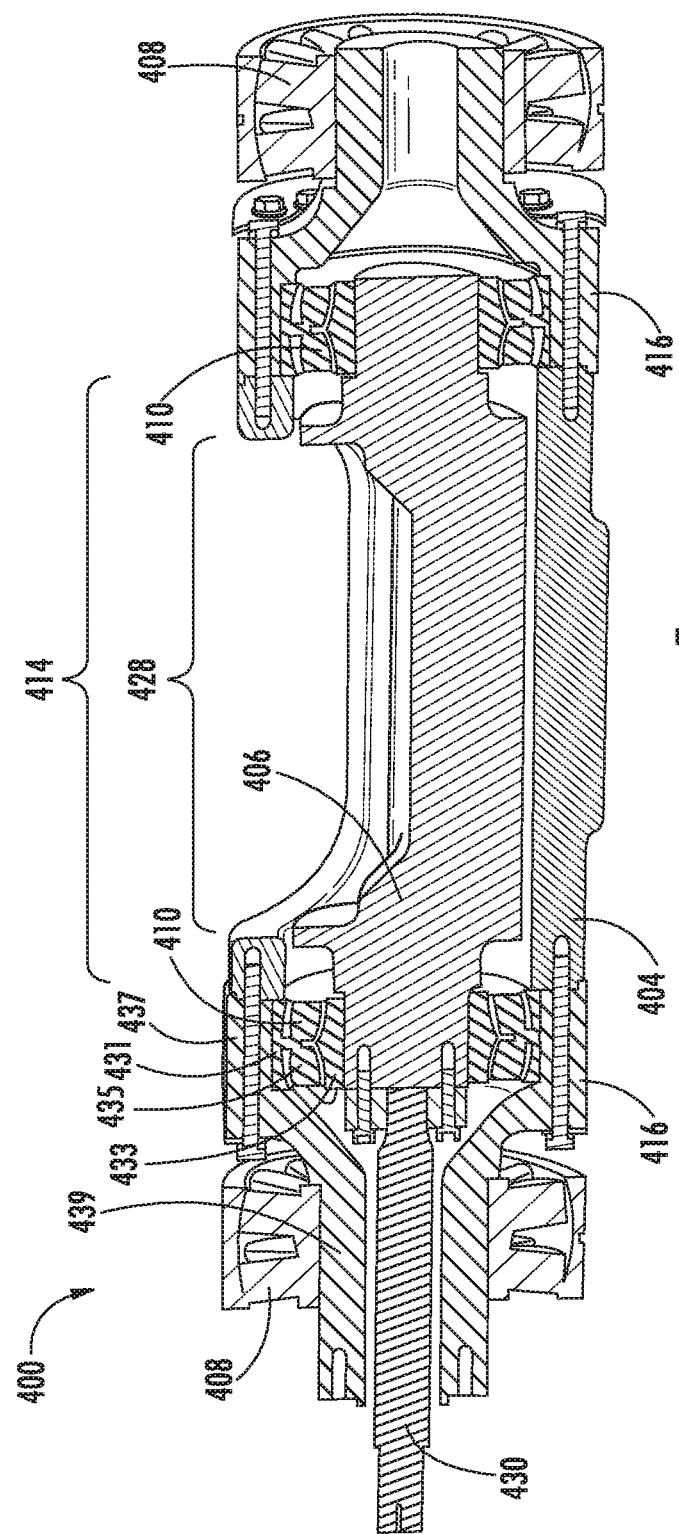
FIG. 5 is a cutaway view of the vibration assembly of FIG. 4 illustrating a primary bearing subassembly for supporting the primary eccentric shaft via a support structure and a secondary bearing subassembly for supporting the secondary eccentric shaft within the primary eccentric shaft.

To illustrate additional details of the vibration assembly 400 of FIG. 4, a cutaway view of the vibration assembly 400 of FIG. 4 is illustrated by FIG. 5. As shown by FIGS. 4 and 5, a primary bearing subassembly 408 supports the primary eccentric shaft 404, which has a primary imbalance mass 414 coupled between a pair of journals 416, via a support structure (not shown). As shown by FIG. 5, a secondary bearing subassembly 410 supports the secondary eccentric shaft 406, which has a secondary imbalance mass 428 coupled to a secondary transmission shaft 430, in a recess within the primary eccentric shaft 404. In this embodiment, the secondary bearing subassemblies 410 are disposed inside the journals 416 of the primary eccentric shaft 404, with the journals 416 transmitting vibration from the secondary eccentric shaft 406 therethrough to the support structure of the vibration assembly 400.

In some embodiments, the primary and/or secondary bearing subassemblies 408, 410 may include different types of bearings, such as roller bearings (i.e., rollers), fluid bearings (such as oil bearings, for example), electromagnetic bearings, or a combination thereof. For example, in this embodiment, the secondary bearing subassemblies 410 are roller bearing subassemblies, which include an outer collar 431 engaging the primary eccentric shaft 404, an inner collar 433 engaging the secondary eccentric shaft 406, and a plurality of rollers 435 disposed between the outer collar 431 and inner collar 433. In response to the primary eccentric shaft 404 rotating about the axis of rotation A at the first rotational speed and the secondary eccentric shaft 406 rotating about the axis of rotation A at the second rotational speed, the roller bearings 435 roll the outer collar 431 and the inner collar 433 about the axis of rotation A with respect to each other at a third rotational speed substantially equal to a difference between the first rotational speed and the second rotational speed. In this embodiment, each of the journals 416 also includes a wide annular portion 437 having an internal surface that engages an external surface of the secondary bearing subassembly 410 and a narrow annular portion 439 having an external surface engaging a second external surface of the primary bearing subassembly 408. In this example, the external diameter of the secondary bearing subassemblies 410 is larger than the internal diameter of the primary bearing subassemblies 408, thereby allowing larger and more durable secondary bearing subassemblies 410.

Figure 6:
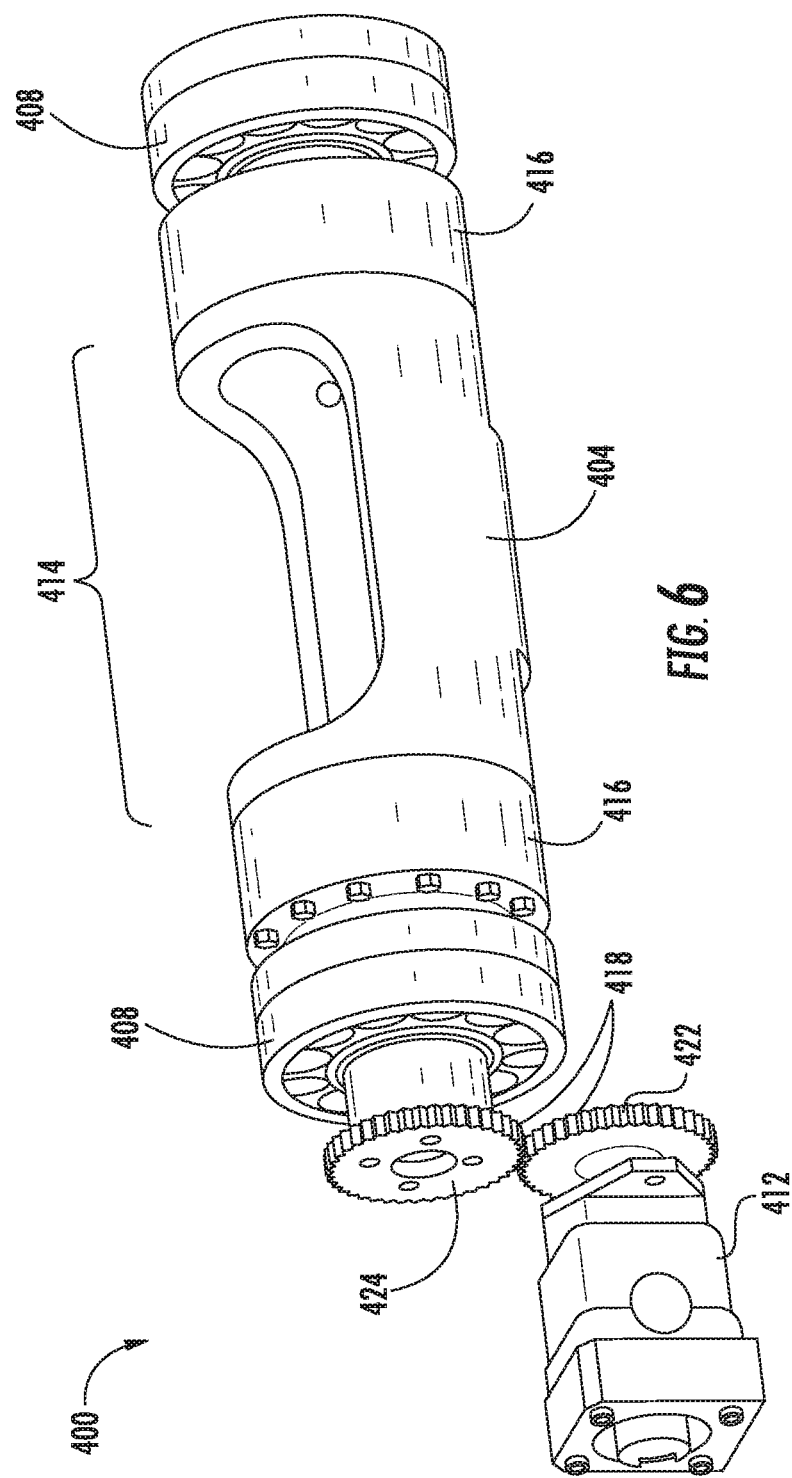
FIG. 6 is a view of the primary eccentric shaft of FIG. 4 according to some embodiments.
Figure 7:
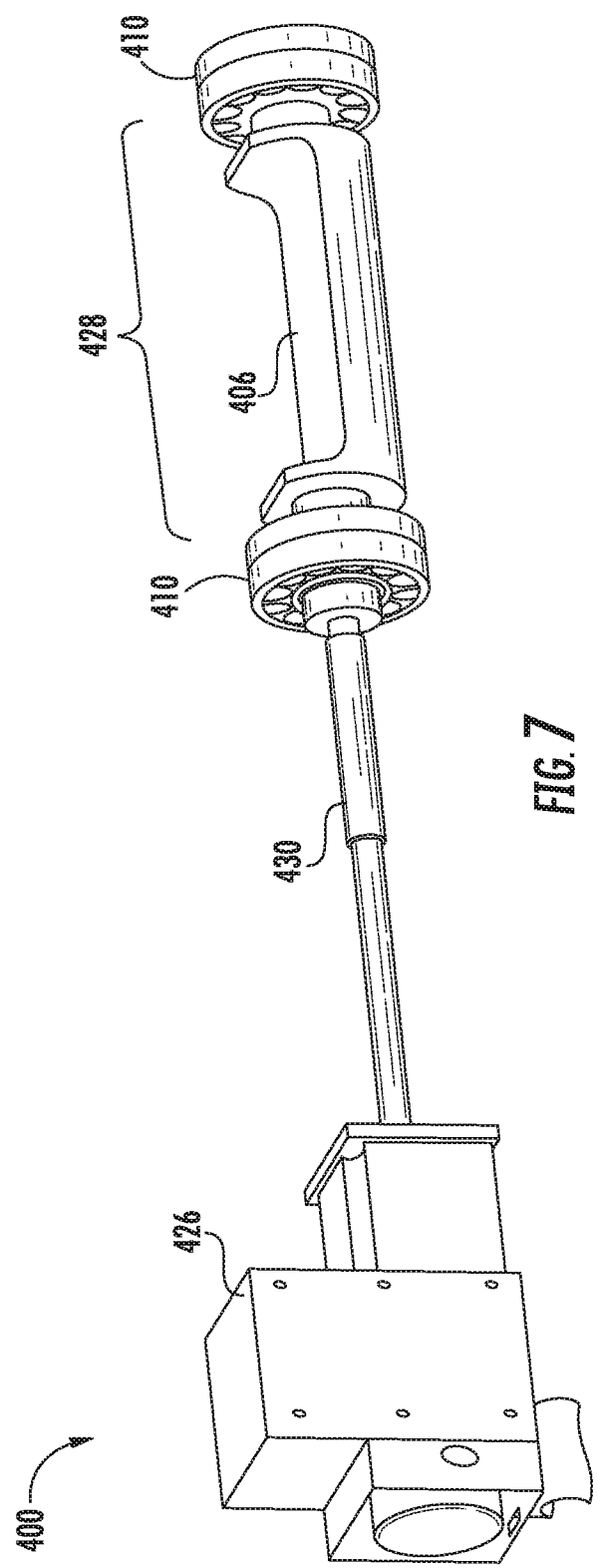
FIG. 7 is a view of the secondary eccentric shaft of FIG. 4 according to some embodiments.

Referring now to FIGS. 6 and 7, respective views of the primary eccentric shaft 404 and the secondary eccentric shaft 406 of FIG. 4 are illustrated, according to some embodiments. In particular, the primary motor 412 of FIG. 6 is connected through a primary transmission subassembly 418, which includes a primary transmission shaft (not shown), a drive gear 422, and a driven gear 424 to rotate the primary eccentric shaft 404. The secondary motor 426 is connected through a secondary transmission shaft 430 to rotate the secondary imbalance mass 428 of the secondary eccentric shaft 406 independently of the primary eccentric shaft 404. In one embodiment, the primary motor 412 is a hydraulic motor capable of rotating the primary eccentric shaft 404 and the secondary motor 426 is an electric motor capable of rotating the secondary eccentric shaft 406 at a higher rotational speed than the primary eccentric shaft 404, but it should be understood that different components may also be used. The primary and secondary eccentric shafts 404, 406 each have a center of mass that is located radially offset from the common axis of rotation A. In the embodiment of FIGS. 4-7, the primary and secondary eccentric shafts 404, 406 are coaxially aligned along a common axis of rotation A, which may also be coaxially aligned with or radially offset from a rotational axis of the drum 16 (see FIG. 1) in which the primary and secondary eccentric shafts 404, 406 are disposed. The primary and secondary motors 412, 426 may be mounted to an interior space of the drum 16 or mounted outside the drum 16 of FIG. 1. In this example, the primary eccentric shaft 404 has a greater mass and resulting eccentric moment about its rotational axis than the secondary eccentric shaft 406. Rotation of the primary and secondary eccentric shafts 404, 406 generates vibration forces, which are transferred through the support subassembly (not shown) to the cylindrical roller surface of the drums 16 of FIG. 1 to form a compacting surface that compacts the substrate. The support structure may include sidewalls of the drums 16 of FIG. 1 and/or couplers to the primary and secondary motors 412, 426 and/or the primary and secondary transmission shafts 420, 430.

Figure 8:
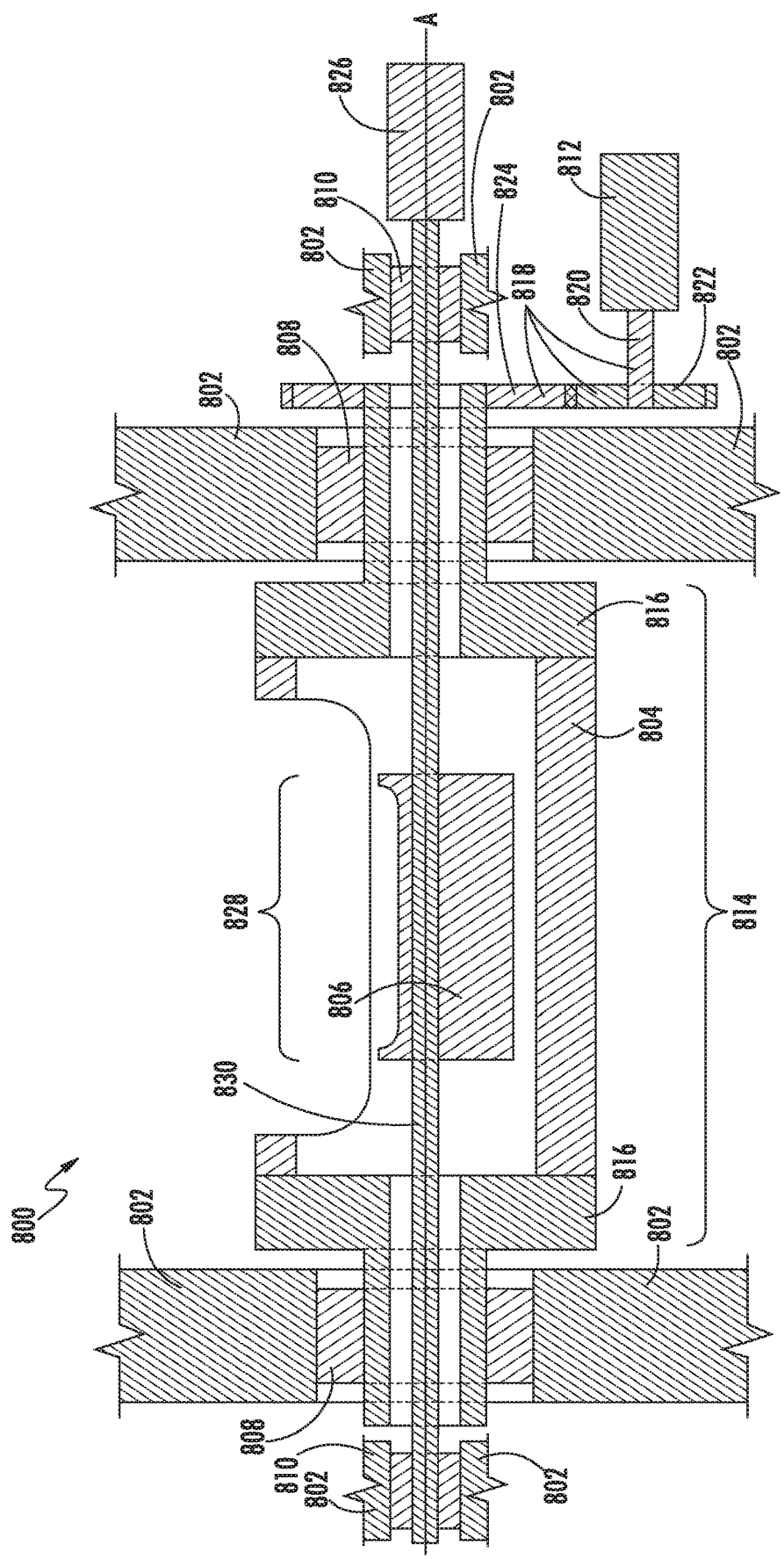
FIG. 8 is a simplified schematic cutaway view of a vibration assembly similar to the vibration assembly of FIG. 2, with a primary bearing subassembly supporting the primary eccentric shaft via a support structure and a secondary bearing subassembly supporting the secondary eccentric shaft via the support structure, according to some embodiments.

It should be understood that other examples may include additional and/or different components in different configurations. In this regard, FIG. 8 is a simplified schematic cutaway view of a vibration assembly 800 similar to the vibration assembly 200 of FIG. 2, with primary bearing subassemblies 808 supporting a primary eccentric shaft 804 via a support structure 802 and secondary bearing subassemblies 810 supporting an independently rotatable secondary eccentric shaft 806 via the support structure directly, according to some embodiments. In this example, both primary and secondary eccentric shafts 804, 806 are supported directly by the support structure 802 via the respective primary and secondary bearing subassemblies 808, 810. One advantage of this arrangement is that the primary bearing subassemblies 808 are not required to support and transmit the entire vibratory load produced by both the primary eccentric shaft 804 and the secondary eccentric shaft 806 of the vibration assembly 800.

The vibration assembly 800 also includes a primary motor 812 and a secondary motor 826, similar to the vibration assembly 200 of FIG. 2. The primary motor 812 is coupled to a transmission subassembly 818 having a primary transmission shaft 820, a drive gear 822, and a driven gear 824 coupled to one of the journals 816 of the primary eccentric shaft 804. A primary imbalance mass 814 is coupled between the journals 816 of the primary eccentric shaft. The secondary motor 826 is coupled directly to the secondary transmission shaft 830, which is coupled in to the secondary imbalance mass 828.

Figure 9:
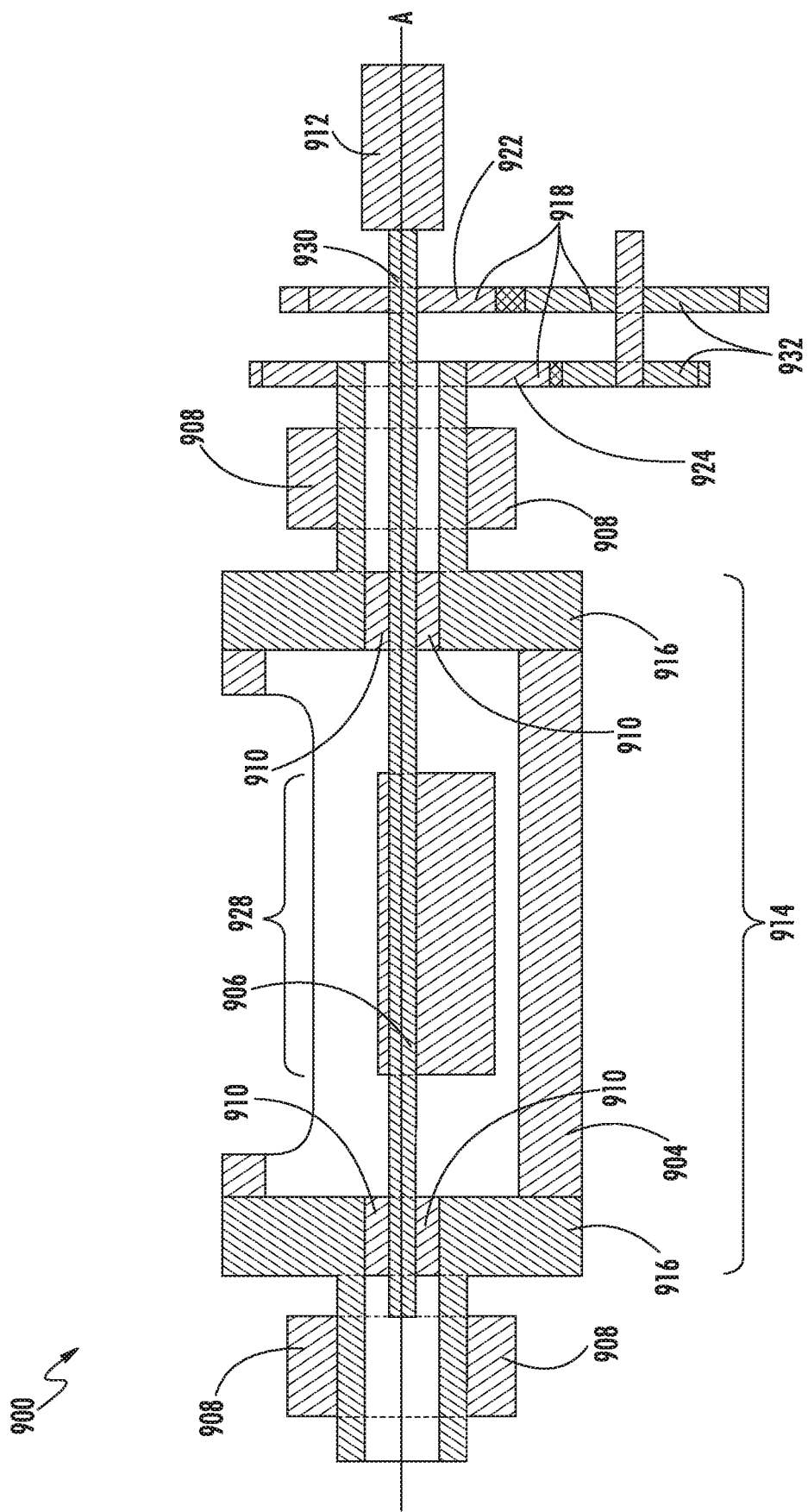
FIG. 9 is a simplified schematic cutaway view of a vibration assembly similar to the vibration assembly of FIG. 2, with a primary eccentric shaft and a secondary eccentric shaft being rotated at different speeds by a single motor via a transmission subassembly, according to some embodiments.

Referring now to FIG. 9, a simplified schematic cutaway view of a vibration assembly 900 similar to the vibration assembly 200 of FIG. 2 is illustrated, with a primary eccentric shaft 904 and a secondary eccentric shaft 906 being rotated at different speeds by a single primary motor 912 via a common transmission subassembly 918, according to some embodiments concepts. In this example, the primary motor 912 rotates a secondary transmission shaft 930 of the secondary eccentric shaft 906 directly. In this example, a drive gear 922 of the transmission subassembly 918 coupled to the secondary transmission shaft 930 rotates an intermediate gear reduction subassembly 932, which in turn rotates a driven gear 924 at a speed that is lower than the rotational speed of the secondary transmission shaft 930. The driven gear 924 is coupled to a journal 916 of the primary eccentric shaft 904, thereby causing the primary eccentric shaft 904 to rotate at a lower speed than the rotational speed of the secondary eccentric shaft 906. In this example, the transmission subassembly 918 has a fixed speed ratio equal or substantially equal to absolute rotational speed of the secondary eccentric shaft 906 divided by the absolute rotational speed of the primary eccentric shaft 904, but it should be understood that other configurations may use a multiple speed gearbox and/or a continuously variable transmission to vary the speed ratio of the primary and secondary eccentric shafts 904, 906. One advantage of this arrangement is that a controller, such as controller 300 of FIG. 3, would only be required to control a single primary motor 912 rather than independently control multiple motors. Additional features of the vibration assembly 900 are similar to corresponding features in other embodiments described herein, including primary bearing subassemblies 908, secondary bearing subassemblies 910, primary imbalance mass 914, and secondary imbalance mass 928.

Figure 10:
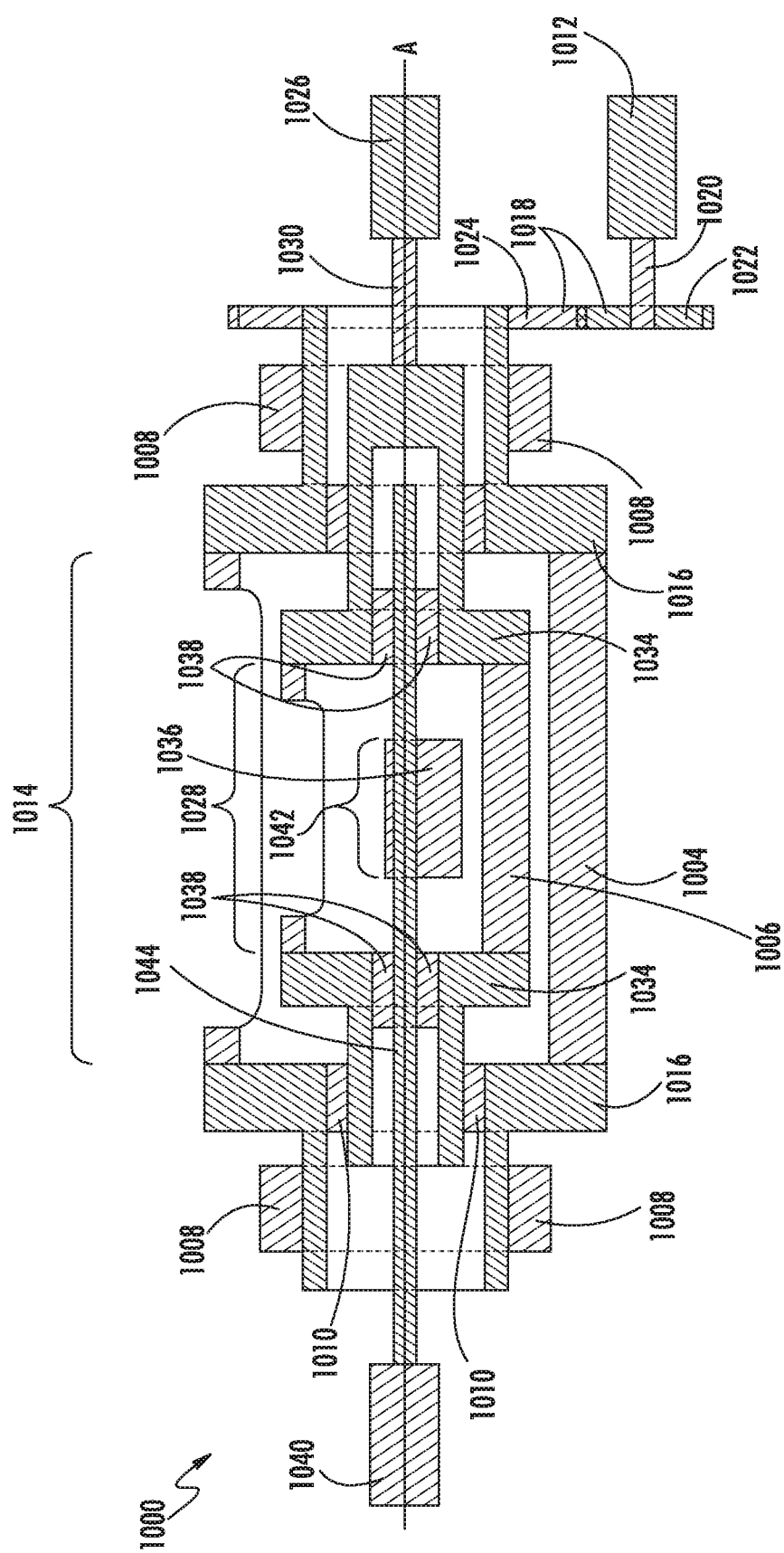
FIG. 10 is a simplified schematic cutaway view of a vibration assembly similar to the vibration assembly of FIG. 2, with a primary bearing subassembly supporting a primary eccentric shaft via a support structure, a secondary bearing subassembly supporting a secondary eccentric shaft via the primary eccentric shaft, and a tertiary bearing subassembly supporting a tertiary eccentric shaft via the secondary eccentric shaft, according to some embodiments.

In some embodiments, additional coaxial eccentric shafts may be used to produce vibration waveforms having even greater complexity. In this regard, FIG. 10 is a simplified schematic cutaway view of a vibration assembly 1000 similar to the vibration assembly 200 of FIG. 2, with a primary bearing subassembly 1008 supporting a primary eccentric shaft 1004 via a support structure (not shown), a secondary bearing subassembly 1010 supporting a secondary eccentric shaft 1006 via the primary eccentric shaft 1004. In this example, a tertiary bearing subassembly 1038 supports a tertiary eccentric shaft 1036 within a recess within the secondary eccentric shaft 1006, in a nested arrangement. A tertiary motor 1040 directly drives a tertiary transmission shaft 1044 of the tertiary eccentric shaft 1036 independently, which rotates the tertiary imbalance mass 1042 of the tertiary eccentric shaft 1036, thereby allowing the vibration assembly 1000 to generate vibratory waveforms having additional complexity. Additional features of the vibration assembly 1000 are similar to corresponding features in other embodiments described herein, including primary motor 1012, primary imbalance mass 1014, primary journals 1016, primary transmission subassembly 1018, primary transmission shaft 1020, drive gear 1022, driven gear 1024, secondary motor 1026, secondary imbalance mass 1028, and secondary journals 1034.

Figure 11:
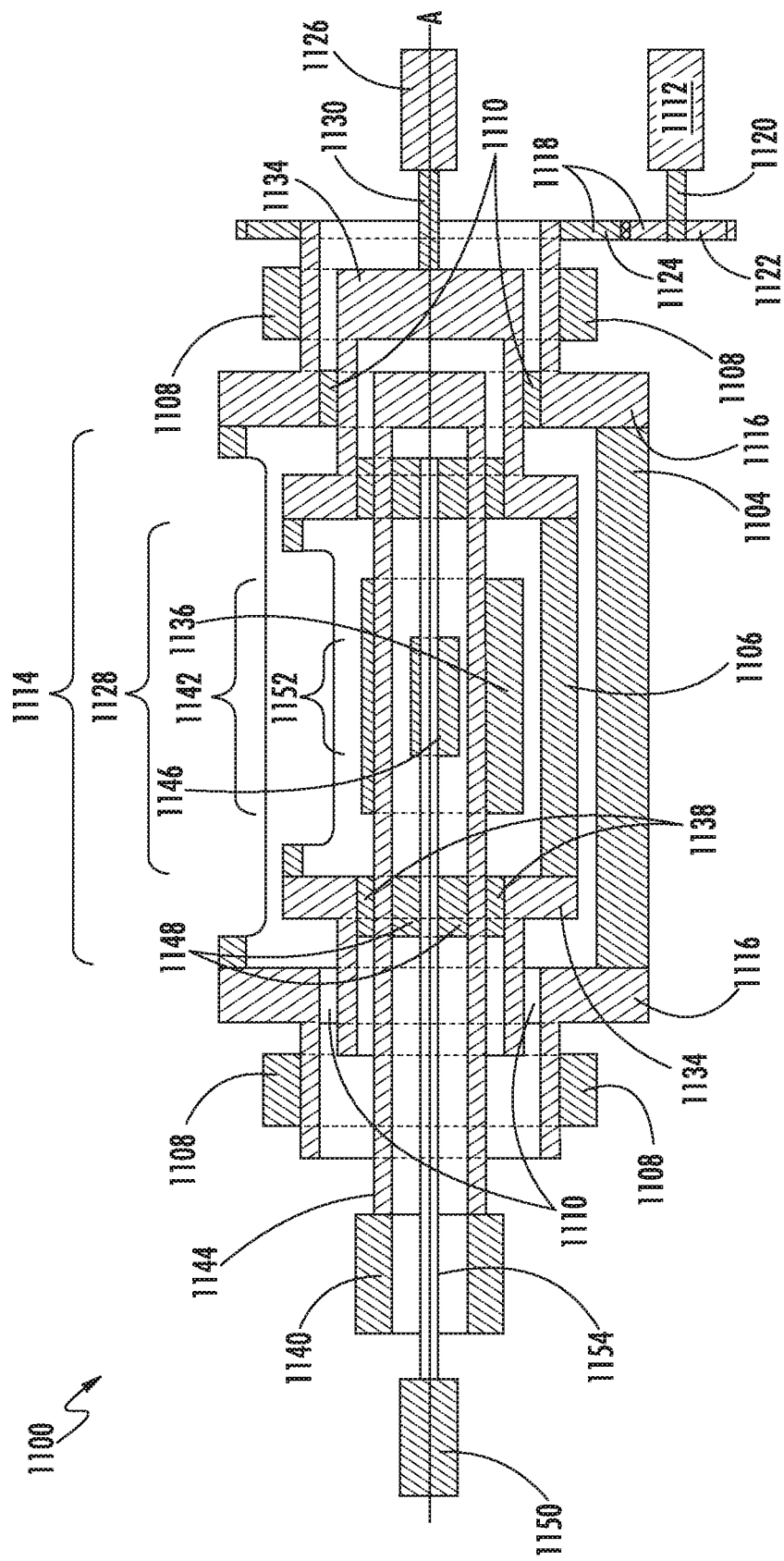
FIG. 11 is a simplified schematic cutaway view of a vibration assembly similar to the vibration assembly of FIG. 10, with a quaternary bearing subassembly supporting a quaternary eccentric shaft via a tertiary eccentric shaft, according to some embodiments.

Similarly, FIG. 11 is a simplified schematic cutaway view of a vibration assembly 1100 similar to the vibration assembly 1000 of FIG. 10, with an additional quaternary bearing subassembly 1148 supporting a quaternary eccentric shaft 1146 via the tertiary eccentric shaft 1136. A quaternary motor 1150 drives a quaternary transmission shaft 1154 of the quaternary eccentric shaft 1146 to rotate a quaternary imbalance mass 1152, to produce waveforms having even greater complexity and customization. Additional features of the vibration assembly 1100 are similar to corresponding features in other embodiments described herein, including primary eccentric shaft 1104, secondary eccentric shaft 1106, primary bearing subassemblies 1108, secondary bearing subassemblies 1110, primary motor 1112, primary imbalance mass 1114, primary journals 1116, primary transmission subassembly 1118, primary transmission shaft 1120, drive gear 1122, driven gear 1124, secondary motor 1126, secondary imbalance mass 1128, secondary transmission shaft 1030, secondary journals 1134, tertiary bearing subassemblies 1138, tertiary motor 1140 (which is a hollow center shaft motor in this example), tertiary imbalance mass 1142, and tertiary transmission shaft 1144.

As discussed in detail above, one benefit of using two (or more) concentrically arranged eccentric shafts is that the vibratory waveforms produced by the vibration assembly can be customized to realize more efficient compaction by the vibration assembly. In this regard, FIG. 12 illustrates plots of the vertical displacement versus time of the primary and secondary eccentric shafts 404, 406 of FIGS. 4-7, which may correspond to the vertical displacement of the drum 16 of FIG. 1 due to vibration forces generated by the primary and secondary eccentric shafts 404, 406 of FIGS. 4-7, as controlled by the controller 300 of FIG. 3 to have a higher rotational speed differential, for example. For the plots of FIG. 12, the controller 300 of FIG. 3 controls the secondary eccentric shaft 406 of FIGS. 4-7 to rotate three times faster than the primary eccentric shaft 404 and so that the center of mass location of the secondary eccentric shaft 406 has a leading rotational angle offset ahead of the center of mass location of the primary eccentric shaft 404 in the direction of rotation of the primary and secondary eccentric shafts 404, 406, when the center of mass location of the primary eccentric shaft 404 is at its maximum distance from the substrate.

Figure 12:
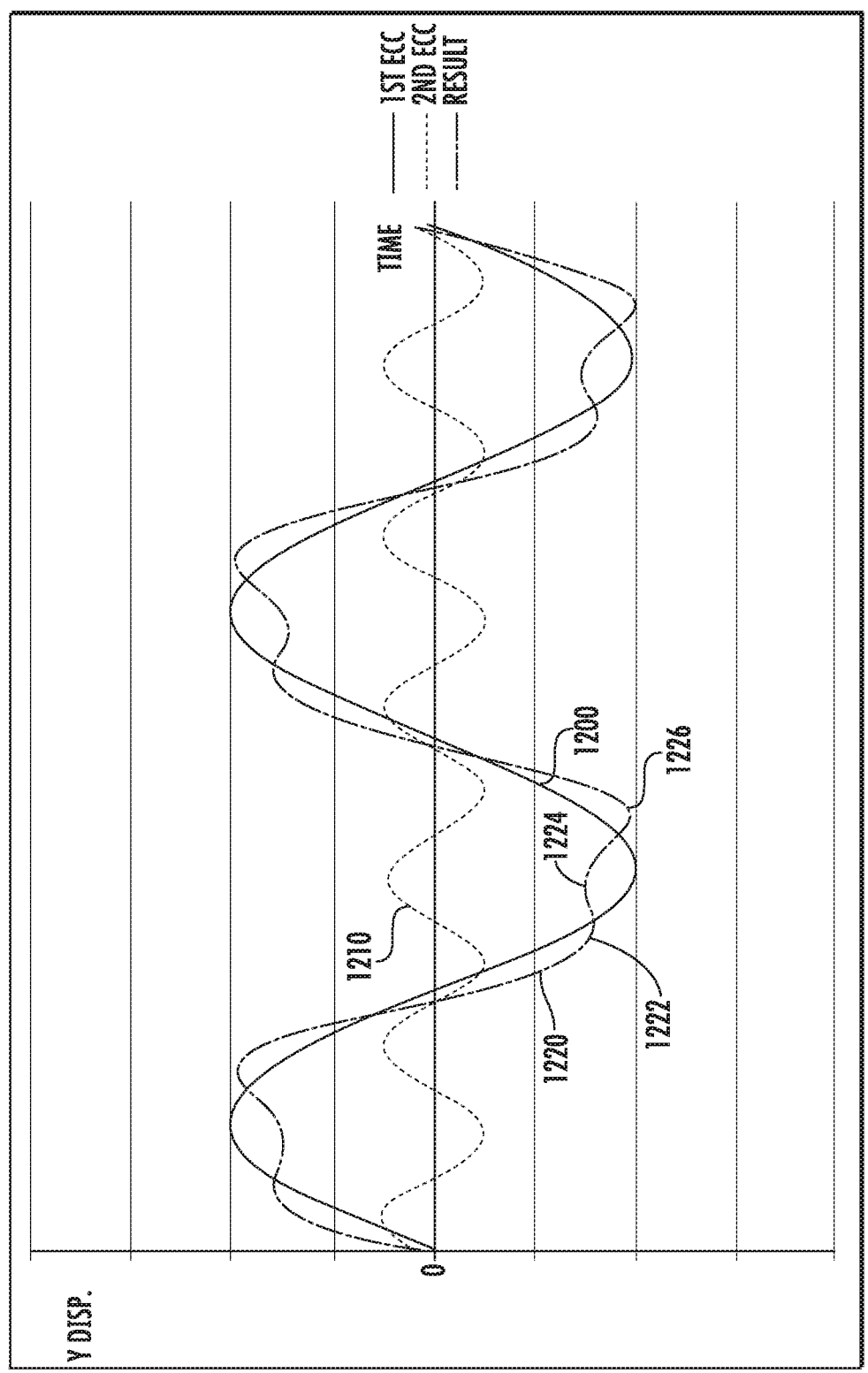
FIG. 12 illustrates plots of the vertical displacement of the primary and secondary eccentric shafts over time, which may correspond to the vertical displacement of the drum due to vibration forces generated by the primary and secondary eccentric shafts of FIG. 2 while controlled by the controller of FIG. 3 according to some embodiments.

Plot 1200 of FIG. 12 illustrates the vertical displacement amplitude of the primary eccentric shaft 404 of FIGS. 4-7 over time, which may correspond to the vertical displacement of the drum 16 of FIG. 1 due to vibration forces generated by rotation of the primary eccentric shaft 404 (i.e., without force contribution from the secondary eccentric shaft 406). Plot 1210 of FIG. 12 illustrates the relatively smaller vertical displacement amplitude of the secondary eccentric shaft 406 of FIGS. 4-7 over time, which may correspond to the vertical displacement of the drum 16 of FIG. 1 due to vibration forces generated by rotation of the secondary eccentric shaft 406 (i.e., without contribution from the primary eccentric shaft 404). Plot 1220 of FIG. 12 illustrates a composite displacement waveform generated by the combined vibration forces generated by rotation of both the primary eccentric shaft 404 and the secondary eccentric shaft 406 of FIGS. 4-7, which vibrates the compacting surface (i.e., the drum surface) upwards and downwards.

It is observed in FIG. 12 that by rotating the secondary eccentric shaft 406 of FIGS. 4-7 three times faster than the primary eccentric shaft 404 and with the leading rotational angle offset, the composite displacement waveform of plot 1220 includes a zero amplitude coordinate (i.e., 0 value along Y-axis), a wave section located above the zero amplitude coordinate (i.e., wave section above the X-axis), and a wave section located below the zero-amplitude coordinate (i.e., wave section below the X-axis). Referring to the composite displacement waveform of plot 1220, the wave section located below the zero-amplitude coordinate includes a sequence of a first occurring downward peak 1222, a second occurring upward peak 1224, and a third occurring downward peak 1226 that has a larger downward amplitude than the first occurring downward peak 1222.

In this example, the shape of the composite displacement waveform of plot 1220 causes the drum 16 of FIG. 1 to compact the substrate over a greater time duration compared to the purely sinusoidal waveform of plot 1200 alone. The substrate compression provided by the composite displacement waveform of plot 1220 may avoid formation of a bow wave of the substrate material in front of the drum 16, longitudinal displacement of the material from the substrate, fracturing of an aggregate of the substrate, and/or formation of marks on the substrate along edges of the cylindrical surface of the drum 16. It should be understood that the above example is one of many different complex composite waveforms that may be produced by the embodiments disclosed herein.

When an element is referred to as being "connected", "coupled", "responsive", "mounted", or variants thereof to another element, it can be directly connected, coupled, responsive, or mounted to the other element or intervening elements may be present. In contrast, when an element is referred to as being "directly connected", "directly coupled", "directly responsive", "directly mounted" or variants thereof to another element, there are no intervening elements present. Like numbers refer to like elements throughout. As used herein, the singular forms "a", "an" and "the" are intended to include the plural forms as well, unless the context clearly indicates otherwise. Well-known functions or constructions may not be described in detail for brevity and/or clarity. The term "and/or" and its abbreviation "/" include any and all combinations of one or more of the associated listed items.

It will be understood that although the terms first, second, third, primary, secondary, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings the disclosure. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but do not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Persons skilled in the art will recognize that certain elements of the above-described embodiments may variously be combined or eliminated to create further embodiments, and such further embodiments fall within the scope and teachings of the disclosure. It will also be apparent to those of ordinary skill in the art that the above-described embodiments may be combined in whole or in part to create additional embodiments within the scope and teachings disclosed herein. Thus, although specific embodiments of, and examples for, embodiments are described herein for illustrative purposes, various equivalent modifications are possible within the scope of the disclosure, as those skilled in the relevant art will recognize. Accordingly, the scope of the invention is determined from the appended claims and equivalents thereof.

The invention claimed is:

1. A surface compactor machine comprising:
    a compacting surface for compacting a substrate;
    a support subassembly connected to the compacting surface;
    a primary eccentric shaft having a first axis of rotation;
    a secondary eccentric shaft disposed in a recess within the primary eccentric shaft, the secondary eccentric shaft having the first axis of rotation;
    a primary bearing subassembly disposed between the primary eccentric shaft and the support subassembly for transferring vibration from the primary eccentric shaft through the support subassembly to the compacting surface;
    a secondary bearing subassembly disposed between the primary eccentric shaft and the secondary eccentric shaft for supporting the secondary eccentric shaft and transferring vibration from the secondary eccentric shaft to the primary eccentric shaft during rotation of the secondary eccentric shaft with respect to the primary eccentric shaft;

a first motor coupled to the primary eccentric shaft for rotating the primary eccentric shaft about the first axis of rotation at a first rotational speed, the first motor comprising a first output shaft for rotating about a second axis of rotation different from the first axis of rotation;

a second motor coupled to the secondary eccentric shaft for rotating the secondary eccentric shaft about the first axis of rotation at a second rotational speed independently of the first motor rotating the primary eccentric shaft, wherein the primary eccentric shaft rotates with respect to the secondary eccentric shaft at a non-zero relative rotational speed, the second motor comprising a second output shaft for rotating about the first axis of rotation; and a transmission assembly coupled between the first output shaft and the primary eccentric shaft; and a controller for controlling at least one of the first motor and the second motor during a compaction operation while the compacting surface is rotating to continuously rotate the primary and secondary eccentric shafts at different rotational speeds.

2. The surface compactor machine of claim 1, wherein the first motor and the second motor are disposed at a first end of the primary eccentric shaft and the secondary eccentric shaft.

3. The surface compactor machine of claim 1, wherein the first rotational speed is in a first rotational direction about the first axis of rotation and the second rotational speed is at least two times the first rotational speed in the first rotational direction.

4. The surface compactor machine of claim 1, wherein the first rotational speed is in a first rotational direction about the first axis of rotation and the second rotational speed is in a second rotational direction opposite the first rotational direction.

5. The surface compactor machine of claim 1, wherein at least a portion of the secondary bearing subassembly is movable with respect to the primary eccentric shaft and the secondary eccentric shaft such that rotating the primary eccentric shaft at the first rotational speed and rotating the secondary eccentric shaft at the second rotational speed causes the at least a portion of the secondary bearing subassembly to rotate about the first axis of rotation at a third rotational speed substantially equal to a difference between the first rotational speed and the second rotational speed.

6. The surface compactor machine of claim 5, wherein the third rotational speed is at least 1000 rpm.

7. The surface compactor machine of claim 1, wherein the secondary bearing subassembly comprises a plurality of roller bearing subassemblies, each roller bearing subassembly comprising:

an outer collar engaging the primary eccentric shaft;
an inner collar engaging the secondary eccentric shaft; and
a plurality of roller bearings disposed between the outer collar and inner collar for rolling the outer collar and the inner collar about the first axis of rotation with respect to each other at a third rotational speed in response to the primary eccentric shaft rotating about the first axis of rotation at the first rotational speed and the secondary eccentric shaft rotating about the first axis of rotation at the second rotational speed, the third rotational speed substantially equal to a difference between the first rotational speed and the second rotational speed.

8. The surface compactor machine of claim 1, wherein the primary eccentric shaft comprises a primary imbalance mass, a first journal, and a second journal, the primary imbalance mass disposed between the first journal and the second journal, wherein the secondary eccentric shaft comprises a secondary imbalance mass, a first shaft portion, and a second shaft portion, the secondary imbalance mass disposed between the first shaft portion and the second shaft portion, wherein the secondary bearing subassembly comprises:
a first secondary bearing subassembly disposed between an inner surface of the first journal of the primary eccentric shaft and an outer surface of the first shaft portion of the secondary eccentric shaft; and
a second secondary bearing subassembly disposed between an inner surface of the second journal of the primary eccentric shaft and an outer surface of the second shaft portion of the secondary eccentric shaft.

9. The surface compactor machine of claim 8, wherein the primary bearing subassembly comprises:
a first primary bearing subassembly disposed between an outer surface of the first journal of the primary eccentric shaft and the support subassembly; and
a second primary bearing subassembly disposed between an outer surface of the second journal of the primary eccentric shaft and the support subassembly.

10. The surface compactor machine of claim 9, wherein each of the first journal and the second journal comprises:
a wide annular portion having a first internal surface engaging a first external surface of the secondary bearing subassembly, the first internal surface and the first external surface substantially having a first diameter; and
a narrow annular portion having a second external surface engaging a second internal surface of the primary bearing subassembly, the second internal surface and the second external surface substantially having a second diameter smaller than the first diameter.

11. The surface compactor machine of claim 1, wherein the transmission subassembly has a fixed speed ratio substantially equal to the second rotational speed divided by the first rotational speed.

12. The surface compactor machine of claim 1, further comprising:
a tertiary eccentric shaft disposed in a recess within the secondary eccentric shaft, the tertiary eccentric shaft having the first axis of rotation, the tertiary eccentric shaft configured to rotate about the first axis of rotation at a third rotational speed; and
a tertiary bearing subassembly disposed between the secondary eccentric shaft and the tertiary eccentric shaft for supporting the tertiary eccentric shaft during rotation of the tertiary eccentric shaft with respect to the secondary eccentric shaft.

13. The surface compactor machine of claim 12, further comprising:
a quaternary eccentric shaft disposed around the tertiary eccentric shaft and inside the primary bearing subassembly, the quaternary eccentric shaft having the first axis of rotation, the quaternary eccentric shaft configured to rotate about the first axis of rotation at a fourth rotational speed; and a quaternary bearing subassembly disposed between the tertiary eccentric shaft and the quaternary eccentric shaft for supporting the quaternary eccentric shaft during rotation of the quaternary eccentric shaft with respect to the tertiary eccentric shaft.

14. A method of compacting a substrate using a surface compacting machine, the method comprising:
   operating a motor to drive a transmission assembly;
   continuously rotating, via the transmission assembly while the compacting surface of the surface compacting machine is rotating, a primary eccentric shaft about a first axis of rotation at a first rotational speed;
   continuously rotating, via the transmission assembly while the compacting surface is rotating, a secondary eccentric shaft disposed in a recess within the primary eccentric shaft about the first axis of rotation at a second rotational speed; and
   adjusting the transmission assembly to adjust the non-zero relative rotational speed to a different non-zero relative rotational speed.

15. The method of claim 14, wherein the transmission assembly comprises a multiple speed gearbox having a plurality of gear ratios, and wherein adjusting the transmission assembly comprises disengaging a first gear ratio of the plurality of gear ratios and engaging a second gear ratio of the plurality of gear ratios to adjust the non-zero relative rotational speed to the different non-zero relative rotational speed.

16. The method of claim 14, wherein the transmission assembly comprises a continuously variable transmission, and wherein adjusting the transmission assembly comprises adjusting a speed ratio of the primary eccentric shaft and the secondary eccentric shaft to adjust the non-zero relative rotational speed to the different non-zero relative rotational speed.

17. A surface compactor vehicle comprising:
a vehicle chassis; and
a compacting roller assembly coupled to the vehicle chassis, the compacting roller assembly comprising:
   a substantially cylindrical compacting surface for rolling over a substrate to compact the substrate;
   a support subassembly connected to the compacting surface;
   a secondary eccentric shaft having a first axis of rotation;
   a primary eccentric shaft disposed around the secondary eccentric shaft, the primary eccentric shaft having the first axis of rotation;
   a secondary bearing subassembly disposed between the secondary eccentric shaft and the primary eccentric shaft for supporting the secondary eccentric shaft during rotation of the secondary eccentric shaft with respect to the primary eccentric shaft;
   a primary bearing subassembly disposed between the primary eccentric shaft and the support subassembly for transferring vibration from the secondary eccentric shaft and the primary eccentric shaft through the support subassembly to the compacting surface;
   at least one motor coupled to the secondary eccentric shaft and the primary eccentric shaft for simultaneously rotating the secondary eccentric shaft at a first rotational speed about the first axis of rotation and rotating the primary eccentric shaft at a second rotational speed, wherein the primary eccentric shaft rotates with respect to the secondary eccentric shaft at a non-zero relative rotational speed; and
a controller for controlling the at least one motor during a compaction operation while the compacting surface is rotating to continuously rotate the primary and eccentric shafts at different rotational speeds, wherein the non-zero relative rotational speed is at least 1000 rpm.

* * * * *